United States Patent
Muraoka et al.

(10) Patent No.: US 10,510,005 B2
(45) Date of Patent: Dec. 17, 2019

(54) PREDICTION FUNCTION CREATION DEVICE, PREDICTION FUNCTION CREATION METHOD, AND COMPUTER-READABLE STORAGE MEDIUM

(71) Applicant: NEC Corporation, Minato-ku, Tokyo (JP)

(72) Inventors: Yusuke Muraoka, Tokyo (JP); Yukitaka Kusumura, Tokyo (JP); Hironori Mizuguchi, Tokyo (JP); Dai Kusui, Tokyo (JP)

(73) Assignee: NEC CORPORATION, Tokyo (JP)

( * ) Notice: Subject to any disclaimer, the term of this patent is extended or adjusted under 35 U.S.C. 154(b) by 788 days.

(21) Appl. No.: 14/895,023

(22) PCT Filed: Jun. 6, 2014

(86) PCT No.: PCT/JP2014/065102
§ 371 (c)(1),
(2) Date: Dec. 1, 2015

(87) PCT Pub. No.: WO2014/199920
PCT Pub. Date: Dec. 18, 2014

(65) Prior Publication Data
US 2016/0117588 A1    Apr. 28, 2016

(30) Foreign Application Priority Data
Jun. 12, 2013 (JP) .................................. 2013-123482

(51) Int. Cl.
*G06N 5/02* (2006.01)
*G06N 20/00* (2019.01)
*G06Q 10/06* (2012.01)

(52) U.S. Cl.
CPC ............... *G06N 5/02* (2013.01); *G06N 20/00* (2019.01); *G06Q 10/06375* (2013.01)

(58) Field of Classification Search
CPC ...................................................... G06N 3/00
See application file for complete search history.

(56) References Cited

U.S. PATENT DOCUMENTS 6,182,058 B1 *   1/2001   Kohavi ............... G06K 9/6282
                                                   706/20
6,789,070 B1     9/2004   Willett et al.

FOREIGN PATENT DOCUMENTS

JP        2008-234352 A      10/2008

OTHER PUBLICATIONS

Wang et al., Selective Ensemble Approach for Classification of Datasets with Incomplete Values, Foundations of Intelligent Systems at pp. 281-286 (2011) (Year: 2011).*

(Continued)

*Primary Examiner* — Kamran Afshar
*Assistant Examiner* — Benjamin J Buss

(57) ABSTRACT

The prediction function creation device according to the present invention for creating a prediction function to derive an objective variable by using a set of samples that include explanatory variables and an objective variable, the device includes: a clustering unit that clusters the respective samples by giving labels, and assigns weights to each label in accordance with patterns of missing values for the explanatory variables in labeled samples; a child model creation unit that makes portions of the training data partial training data on the basis of the weights, and determines an explanatory variable that constitutes the prediction function on the basis of patterns of missing values for the explanatory variables in the samples; and a mixture model creation unit that creates the prediction function with respect to each (Continued)

pattern of missing values by using the explanatory variable and the determined partial training data.

7 Claims, 11 Drawing Sheets

(56) References Cited

OTHER PUBLICATIONS

Krause & Polikar, AnEnsemble of Classifiers Approach for the Missing Feature Problem, in Proc. of the International Joint Conference on Neural Networks at pp. 553-558 (2003) (Year: 2003).*
Saar-Tsechansky & Provost, Handling Missing Values when Applying Classification Models, J. of Mach. Learning Research 8 (2007) at pp. 1625-1657 (Year: 2007).*
Maytal Saar-Tsechansky and Foster Provost, "Handling Missing Values when Applying Classification Models", Journal of Machine Learning Research 8 (2007) 1625-1657.
Yoshihiro Miyakoshi et al., "Missing Value Imputation Method by Using Bayesian Network with Weighted Learning", The transactions of the Institute of Electrical Engineers of Japan, Feb. 1, 2012, vol. 132, No. 2, pp. 299-305 Cited in ISR.
Hisashi Kurasawa et al., "Variable Selection Method in Multiple Regression with Incomplete Sensor Data", the Technical Report of the Institute of Electronics, Information and Communication Engineers, Oct. 10, 2012, vol. 112, No. 242, pp. 149-154, Cited in ISR.
Wang Ling, "Estimation of Missing Values Using a Weighted K-Nearest Neighbors Algorithm", Proceedings of Environmental Science and Information Application Technology, 2009, vol. 3, Jul. 5, 2009, pp. 660-663 Cited in ISR.
International Search Report for PCT Application No. PCT/JP2014/065102, dated Sep. 2, 2014.
English translation of Written opinion for PCT Application No. PCT/JP2014/065102.

* cited by examiner

Fig.5

| NUMBER | X1 | X2 | X3 | Y |
|---|---|---|---|---|
| 1 | * | * | * | * |
| ⋮ | * | * | * | * |
| 5 | * | * | * | * |
| 6 | NA | * | * | * |
| ⋮ | NA | * | * | * |
| 10 | NA | * | * | * |
| 11 | NA | NA | * | * |
| ⋮ | NA | NA | * | * |
| 20 | NA | NA | * | * |
| 21 | * | * | NA | * |
| ⋮ | * | * | NA | * |
| 40 | * | * | NA | * |

Fig.6

| SET OF NON-MISSING VARIABLES | MULTIPLIED VALUE |
|---|---|
| EMPTY SET | 0 |
| X1 | 25 |
| X2 | 30 |
| X3 | 20 |
| X1, X2 | 50 |
| X2, X3 | 20 |
| X1, X3 | 10 |
| X1, X2, X3 | 15 |

Fig.7

| PATTERN OF MISSING VARIABLES | CANDIDATE (X1) | CANDIDATE (X2) | CANDIDATE (X3) | CANDIDATE (X1, X2) | CANDIDATE (X2, X3) |
|---|---|---|---|---|---|
| EMPTY SET | 2 | 2 | 2 | 1 | 1 |
| X1 | 4 | 1 | 1 | 3 | 0 |
| X1, X2 | 3 | 3 | 0 | 5 | 2 |
| X3 | 2 | 1 | 4 | 0 | 3 |
| X2 | 1 | 4 | 1 | 3 | 3 |
| X2, X3 | 0 | 3 | 3 | 2 | 5 |
| X1, X3 | 3 | 0 | 3 | 2 | 2 |

Fig.8

| PATTERN OF MISSING VARIABLES | LABEL 1 (X2) | LABEL 2 (X3) | LABEL 3 (X1, X2) | LABEL 4 (X2, X3) | LABEL 5 (X1) |
|---|---|---|---|---|---|
| EMPTY SET | – | – | 0.5 | 0.5 | – |
| X1 | 0.21 | 0.21 | – | 0.58 | – |
| X1, X2 | – | 1 | – | – | – |
| X3 | 0.27 | – | 0.73 | – | – |
| X2 | – | 0.5 | – | – | 0.5 |
| X2, X3 | – | – | – | – | 1 |
| X1, X3 | 1 | – | – | – | – |

Fig.9

| LABEL | SAMPLE NUMBER |
|---|---|
| LABEL 1 (X2) | 1-10, 21-40 |
| LABEL 2 (X3) | 1-20 |
| LABEL 3 (X1, X2) | 1-5, 21-40 |
| LABEL 4 (X2, X3) | 1-10 |
| LABEL 5 (X1) | 1-5, 21-40 |

Fig.10

| PATTERN OF MISSING VARIABLES | FINAL PREDICTION FUNCTION |
|---|---|
| EMPTY SET | $0.5\ f_3(x1,x2) + 0.5\ f_4(x2,x3)$ |
| X1 | $0.21\ f_1(x2) + 0.21\ f_2(x3) + 0.58\ f_4(x2,x3)$ |
| X1, X2 | $f_2(x3)$ |
| X3 | $0.27\ f_1(x2) + 0.73\ f_3(x1,x2)$ |
| X2 | $0.5\ f_2(x3) + 0.5\ f_5(x1)$ |
| X2, X3 | $f_5(x1)$ |
| X1, X3 | $f_1(x2)$ |

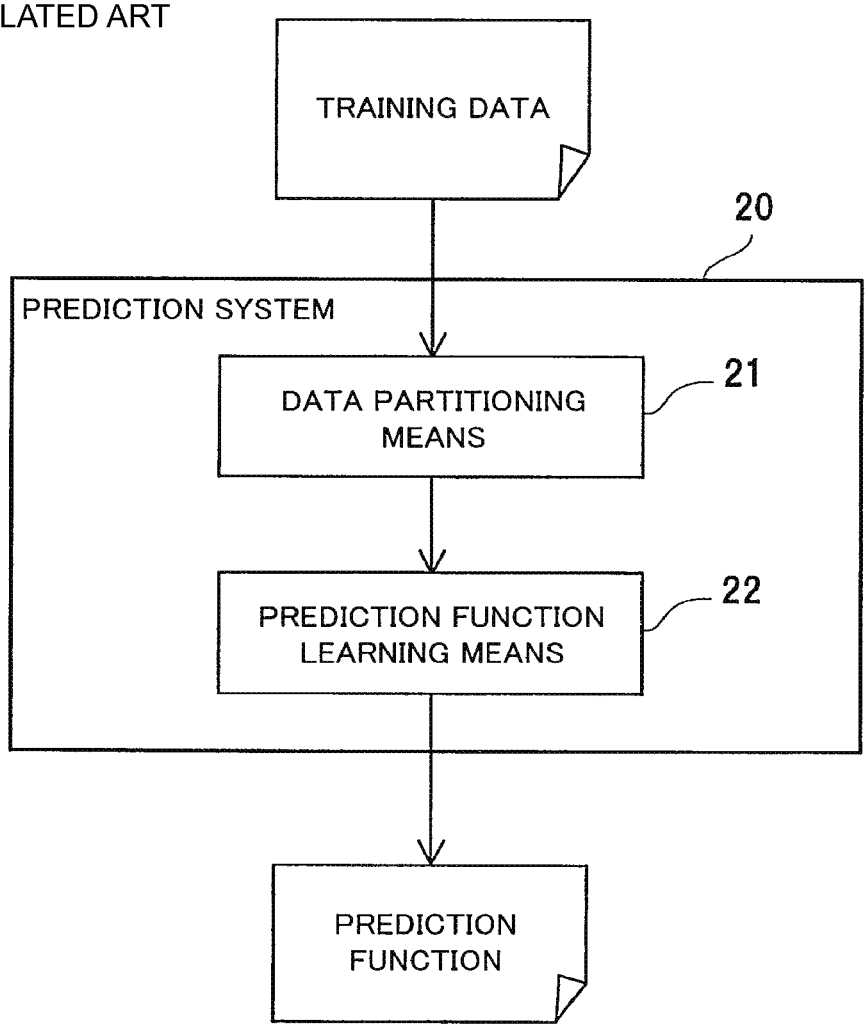

PREDICTION FUNCTION CREATION DEVICE, PREDICTION FUNCTION CREATION METHOD, AND COMPUTER-READABLE STORAGE MEDIUM

This application is a National Stage Entry of PCT/JP2014/065102 filed on Jun. 6, 2014 which claims priority from Japanese Patent Application 2013-123482 filed on Jun. 12, 2013, the contents of all of which are incorporated herein by reference, in their entirety.

TECHNICAL FIELD

The present invention relates to a prediction function creation device and a prediction function creation method for creating a prediction function that derives an objective variable from a set of samples including explanatory variables and the objective variable, and a computer-readable recording medium recording a program for achieving the prediction function creation device and the prediction function creation method.

BACKGROUND ART

In various business fields, predicting the future from obtainable data is effective for business improvement. For example, in a store, when future sales can be predicted from sales data during the most recent two weeks, inventory control can be appropriately carried out. When it can be predicted whether complaints come from customers and which manner of reception operations causes such complaints from records of reception operations at a call center, complaints can be reduced.

In the description of the present invention, a type of data used as a clue for prediction, such as sales data during the most recent two weeks and records of reception operations at a call center, is referred to as "explanatory variable", and a variable to be predicted, such as future sales and occurrence/non-occurrence of incoming complaints, is referred to as "objective variable". It is assumed that "prediction" is to create a function of explanatory variables and obtain a predicted value of the objective variable.

It is also assumed that past data are available as a clue for the prediction. Past data are a set of samples each of which is a tuple of explanatory variables and an objective variable. Hereinafter, the set of samples is referred to as "training data".

Methods to carry out prediction by use of training data include a method using machine learning. Machine learning is to create a function to output a predicted value of the objective variable by using explanatory variables as input on the basis of training data.

However, there is a problem in applying machine learning. The problem is that machine learning is not applicable when an explanatory variable in the training data has a missing value. For example, when a specific item is out of stock during a certain period of time, the sale of the specific item becomes missing value, which makes machine learning inapplicable. When a portion of records of reception operations has missing values because an operator who has answered a call has missed recording his/her operation, machine learning also becomes inapplicable. That is, many methods using machine learning have a problem in that the methods are not applicable to data including missing values.

On the other hand, a method to impute missing values by a mean value and a method to impute missing values by predicting the missing value from other explanatory variables have been known. However, when a large error occurs in the imputation, these methods cause an unnecessary error in the prediction of the objective variable.

To solve such a problem, NPL 1, for example, discloses a prediction system that can carry out prediction even when a portion of training data, which are used as input, includes missing values for the explanatory variables. FIG. 11 is a block diagram illustrating an example of a conventional prediction system.

As illustrated in FIG. 11, a prediction system 20 includes a data partitioning means 21 and a prediction function learning means 22. When training data is input, the data partitioning means 21 partitions the input training data, and outputs the partitioned training data. When the partitioned training data is input, the prediction function learning means 22 carries out learning to create a prediction function for each partition of training data, and outputs the created prediction functions.

The conventional prediction system illustrated in FIG. 11 operates in the following manner. First, for respective samples in the input training data, the data partitioning means 21 refers to which explanatory variable has a missing value (hereinafter, referred to as "missing manner"), and gives the same label to samples that have the same missing manner.

Next, the prediction function learning means 22 is inputted the labeled training data output by the data partitioning means 21, carries out machine learning with respect to each label, using only a set of samples to which the same label is given as training data, and, consequently, outputs prediction functions.

CITATION LIST

Non Patent Literature

[NPL 1] "Handling Missing Values when Applying Classification Models", Maytal Saar-Tsechansky and Foster Provost, Journal of Machine Learning Research 8 (2007) 1625-1657

SUMMARY OF INVENTION

Technical Problem

However, there is a problem in the prediction system disclosed in the above-described NPL 1. The problem is that, when a lot of variations of missing manner in each sample are involved, accuracy in predicted values is reduced. That is because, when a lot of variations of missing manner are involved, the number of varieties of label that the data partitioning means 21 gives increases in accordance. Thus, the sample size of a set of samples with the same label becomes small. When the sample size is small, accuracy in predicted values created by the prediction functions becomes low.

Accordingly, even when a lot of variations of missing manner for the explanatory variables are involved, it is desirable to achieve a prediction device that can carry out prediction with high accuracy on the basis of input including missing values.

Object of Invention

An example of the object of the present invention is to provide a prediction function creation device, a prediction function creation method, and a computer-readable recording medium that are capable of solving the above-described problem and, even when a lot of variations of missing manner for the explanatory variables are involved, carrying out prediction with high accuracy.

Solution to Problem

For achieving the above-mentioned objection, a prediction function creation device according to an aspect of the present invention for, by using a set of samples that include explanatory variables and an objective variable as training data, creating a prediction function to derive the objective variable, the prediction function creation device includes:

a clustering unit that, in accordance with patterns of missing values for the explanatory variables in respective samples, carries out clustering to give labels to the respective samples, and, to each label, assigns weights in accordance with patterns of missing values for the explanatory variables in samples to which the label is given;

a child model creation unit that, on the basis of the assigned weights, makes portions of the training data partial training data, and, on the basis of patterns of missing values for the explanatory variables in the samples included in the partial training data, determines an explanatory variable that constitutes the prediction function among the explanatory variables with respect to each label; and a mixture model creation unit that, by using the explanatory variable and the partial training data that are determined with respect to each label, creates the prediction function with respect to each pattern of missing values.

Furthermore, for achieving the above-mentioned objection, the A prediction function creation method according to an aspect of the present invention, by using a set of samples that include explanatory variables and an objective variable as training data, creates a prediction function to derive the objective variable. The method includes:

(a) in accordance with patterns of missing values for the explanatory variables in respective samples, carrying out clustering to give labels to the respective samples, and, to each label, assigning weights in accordance with patterns of missing values for the explanatory variables in samples to which the label is given;

(b) on the basis of the assigned weights, making portions of the training data partial training data, and, on the basis of patterns of missing values for the explanatory variables in the samples included in the partial training data, determining an explanatory variable that constitutes the prediction function among the explanatory variables with respect to each label; and (c) by using the explanatory variable and the partial training data that are determined with respect to each label, creating the prediction function with respect to each pattern of missing values.

Furthermore, for achieving the above-mentioned objection, a computer-readable non-transitory recording medium embodying a program, the program causing a computer to perform a method, the method for, by using a set of samples that include explanatory variables and an objective variable as training data, creating a prediction function to derive the objective variable, the method includes:

(a) in accordance with patterns of missing values for the explanatory variables in respective samples, carrying out clustering to give labels to the respective samples, and, to each label, assigning weights in accordance with patterns of missing values for the explanatory variables in samples to which the label is given;

(b) on the basis of the assigned weights, making portions of the training data partial training data, and, on the basis of patterns of missing values for the explanatory variables in the samples included in the partial training data, determining an explanatory variable that constitutes the prediction function among the explanatory variables with respect to each label; and (c) by using the explanatory variable and the partial training data that are determined with respect to each label, creating the prediction function with respect to each pattern of missing values.

Advantageous Effects of Invention

As described above, with the present invention, it is possible to carry out prediction with high accuracy even when a lot of variations of missing manner for the explanatory variables, that is, patterns of missing values for the explanatory variables, are involved.

BRIEF DESCRIPTION OF DRAWINGS

FIG. 5 is a diagram illustrating an example of training data that are used in an example;

FIG. 6 is a diagram illustrating an example of a result of calculation with respect to each variety of set of non-missing variables that are supposed to exist in the example;

FIG. 7 is a diagram illustrating an example of a result of calculation of distances between patterns of missing variables and candidates in the example;

FIG. 8 is a diagram illustrating an example of weights that are assigned to respective labels in the example;

FIG. 9 is a diagram illustrating an example of partial training data in the example;

FIG. 10 is a diagram illustrating a specific example of final prediction functions that are obtained in the example; and FIG. 11 is a block diagram illustrating an example of a conventional prediction system.

DESCRIPTION OF EMBODIMENTS (Summary of Invention)

The present invention has an object to prevent an increase of error when imputing explanatory variables (missing values) that are difficult to be predicted, as with the system disclosed in the above-described NPL 1. In the present invention, different prediction functions are also created in accordance with patterns of missing values of the explanatory variables, as with the system disclosed in the above-described NPL 1. Since an optimum prediction function can be used with respect to each sample, it is possible to suppress a decrease in prediction accuracy.

In the present invention, however, clustering of patterns of missing values for the explanatory variables is carried out, differing from the system disclosed in the above-described NPL 1. Since the number of samples that are used for each prediction function can be increased with this feature, it is possible to suppress a decrease in prediction accuracy even when the number of varieties of pattern of missing values becomes large.

In the description of the present invention, "sample" means a piece of data that includes an explanatory variable and an objective variable. In general, a plurality of explanatory variables are included in a sample. The explanatory variables constitute an explanatory variable vector. The "explanatory variable vector" is a vector that has a numerical value or a sign indicating a missing value as an element.

In the description of the present invention, "training data" means a set of samples. A "child model" means a group of prediction functions that a prediction function creation device of the present invention intermediately outputs. "Partial training data" means data made from a subset of samples and variables in the training data. The partial training data is an input in learning a child model. A "final prediction function" means a prediction function to obtain values of the objective variable for respective patterns of missing values for the explanatory variables. The final prediction function corresponds to an output of the prediction function creation device of the present invention.

(Exemplary Embodiment)

Hereinafter, a prediction function creation device, a prediction function creation method, and a program according to a first exemplary embodiment of the present invention will be described with reference to FIGS. 1 to 4.

[Configuration of Device]

Figure 1:
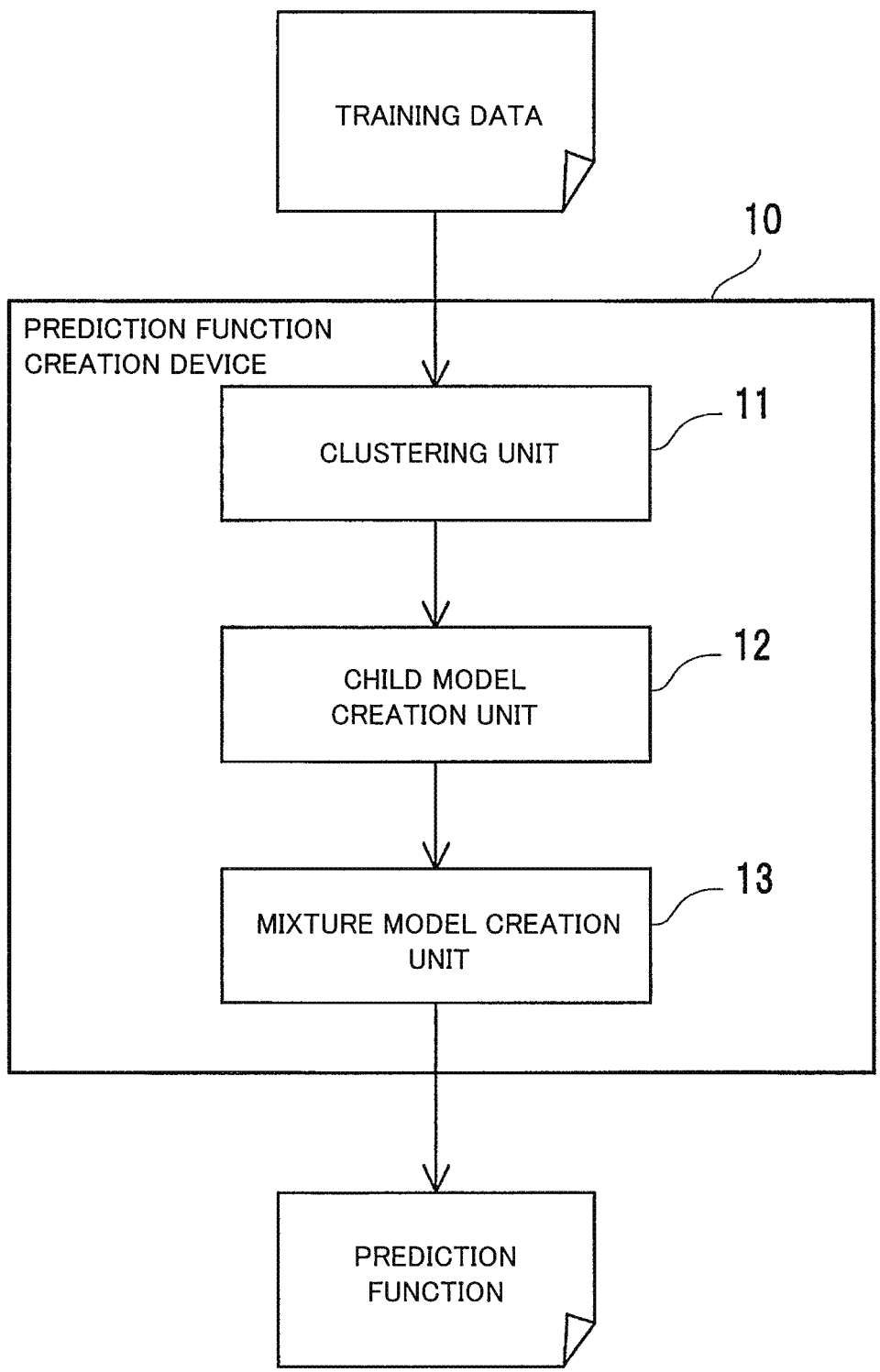
FIG. 1 is a block diagram illustrating a schematic configuration of a prediction function creation device in an exemplary embodiment of the present invention.

First, a schematic configuration of a prediction function creation device 10 according to the exemplary embodiment will be described by using FIG. 1. FIG. 1 is a block diagram illustrating a schematic configuration of the prediction function creation device according to the exemplary embodiment of the present invention.

The prediction function creation device 10, illustrated in FIG. 1, according to the exemplary embodiment is a device that creates prediction functions that derive objective variables, by using a set of samples including explanatory variables and the objective variable as training data. As illustrated in FIG. 1, the prediction function creation device 10 includes a clustering unit 11, a child model creation unit 12, and a mixture model creation unit 13.

The clustering unit 11 carries out clustering to give labels to the respective samples in accordance with patterns of missing values for the explanatory variables in the respective samples. The clustering unit 11 also assigns weights to each label in accordance with patterns of missing values for the explanatory variables in samples to which the label is given. The "patterns of missing values" referred to above include a case in which a single explanatory variable has a missing value, a case in which a plurality of explanatory variables have missing values, and a case of an empty set (a case in which no explanatory variable has a missing value).

The child model creation unit 12 makes a portion of the training data the partial training data on the basis of the assigned weights. On the basis of patterns of missing values for the explanatory variables in samples included in the partial training data, the child model creation unit 12 also determines an explanatory variable (hereinafter, referred to as "prediction variable") that constitutes a prediction function among the explanatory variables with respect to each label.

By using the explanatory variables (prediction variables) each of which is determined with respect to each label and the partial training data, the mixture model creation unit 13 creates a prediction function (hereinafter, referred to as "final prediction function") that derives the objective variable with respect to each pattern of missing values for the explanatory variables.

As described above, in the exemplary embodiment, clustering is carried out in accordance with patterns of missing values for the explanatory variables, and, by using the partial training data created from a result of the clustering, the number of samples for each pattern of missing values can be increased. Thus, with the exemplary embodiment, it is possible to carry out prediction with high accuracy even when a lot of patterns of missing values for the explanatory variables are involved.

Figure 2:
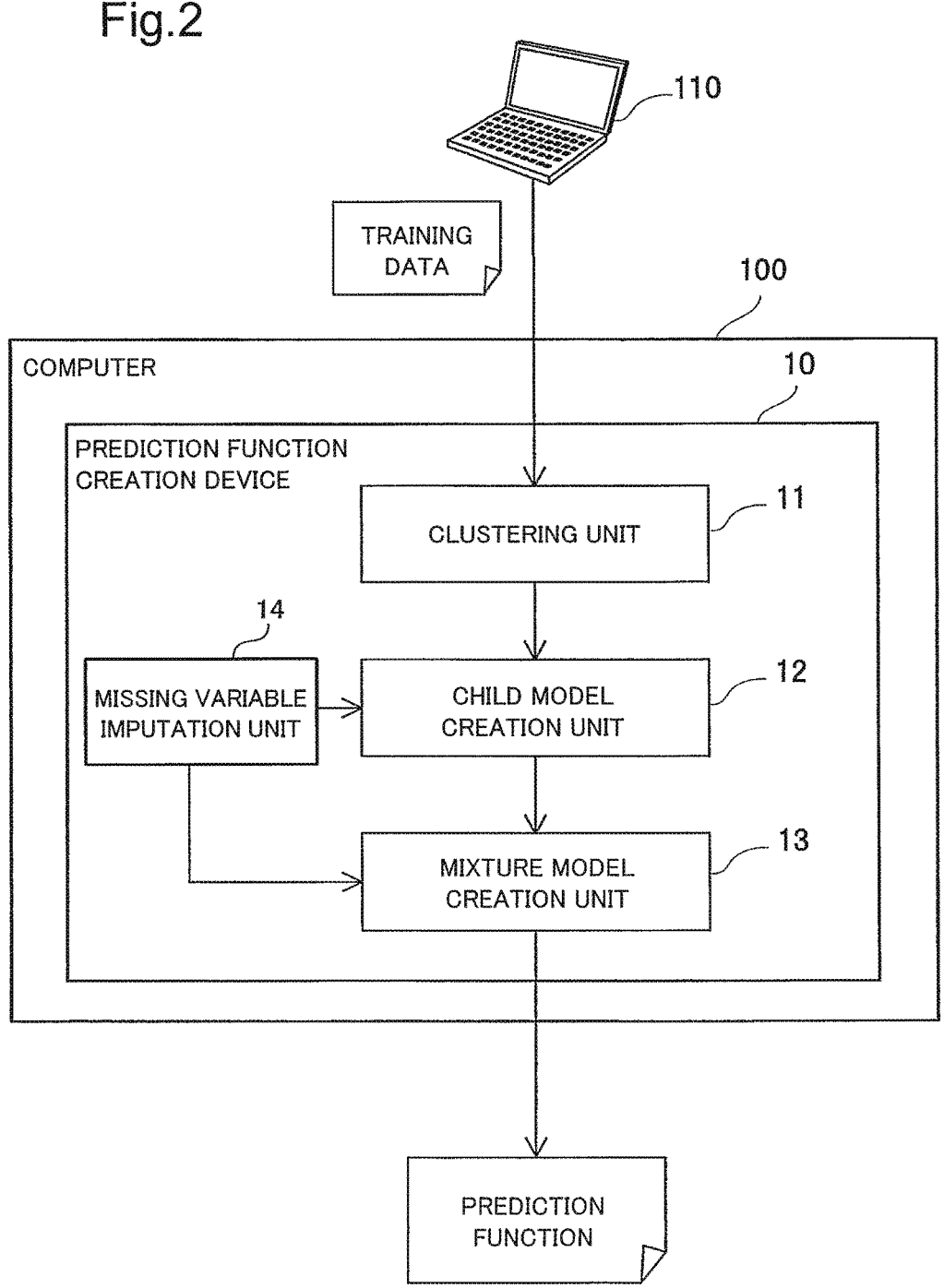
FIG. 2 is a block diagram further specifically illustrating the configuration of the prediction function creation device illustrated in FIG. 1.

Next, by using FIG. 2, a specific configuration of the prediction function creation device 10 according to the exemplary embodiment will be described. FIG. 2 is a block diagram further specifically illustrating the configuration of the prediction function creation device illustrated in FIG. 1.

As illustrated in FIG. 2, in the exemplary embodiment, the prediction function creation device 10 is constructed on a computer 100 with a program. To the computer 100, a terminal 110 for users is connected via a network or the like. The training data are transmitted from the terminal 110. As illustrated in FIG. 2, the prediction function creation device 10 further includes a missing variable imputation unit 14, in addition to the clustering unit 11, the child model creation unit 12, and the mixture model creation unit 13 which are mentioned above.

In the exemplary embodiment, with respect to each variety of set of explanatory variables without missing values corresponding to respective patterns of missing values for the explanatory variables, the clustering unit 11 identifies a group of samples applying to the variety, that is, a group of samples in which a set of explanatory variables constituting one of the varieties have no missing value.

Next, with respect to each pattern of missing values for the explanatory variables, the clustering unit 11 identifies a sample that is included in common in a sample that does not apply to the pattern of missing value and the identified group of samples.

The clustering unit 11 then gives a label to each group of the identified common samples the number of which is greater than or equal to a certain value. Thereafter, the clustering unit 11 assigns a weight to each label in such a way that, the greater the number of common samples identified with respect to each pattern of missing values is, the larger the value of the weight becomes.

In the exemplary embodiment, the child model creation unit 12 make a group of samples, to which labels with weights of a threshold value or greater are given, the partial training data. Next, with respect to each label with weight, the child model creation unit 12 determines a prediction variable in the partial training data to which the label is given. The prediction variable at this time is required to have features that a number of samples which itself does not have a missing value increases, and a number of variables increases, for each label.

In the exemplary embodiment, first, with respect to each label with the weight, the mixture model creation unit 13 creates a prediction function (hereinafter, referred to as "intermediate prediction function") that derives the objective variable from the prediction variable by using the partial training data to which the label is given. With respect to each pattern of missing values, the mixture model creation unit 13 creates a final prediction function by using a weight assigned for the pattern and the intermediate prediction function created for a label to which the weight is assigned.

In other words, in the exemplary embodiment, the mixture model creation unit 13 learns a child model from the partial training data extracted by the child model creation unit 12, by using a prediction variable, with respect to each label. The mixture model creation unit 13 learns a mixture model with respect to each label by adding the learned child models.

When, in partial training data, there is a sample in which a prediction variable (an explanatory variable) of a label given to the partial training data has a missing value, the missing variable imputation unit 14 imputes the prediction variable that has a missing value in the sample. In this case, the mixture model creation unit 13 creates an intermediate prediction function by using a set of the imputed partial training data.

Specifically, first, with respect to each prediction variable, the missing variable imputation unit 14 learns a function that estimates the prediction variable from the values of other explanatory variables as the partial training data to be input data. When a sample to be imputed is input from the child model creation unit 12, the missing variable imputation unit 14 estimates a missing value in the sample by using the learned function, and outputs the sample including the estimated value (partial training data) to the mixture model creation unit 13.

[Operation of Device]

Figure 3:
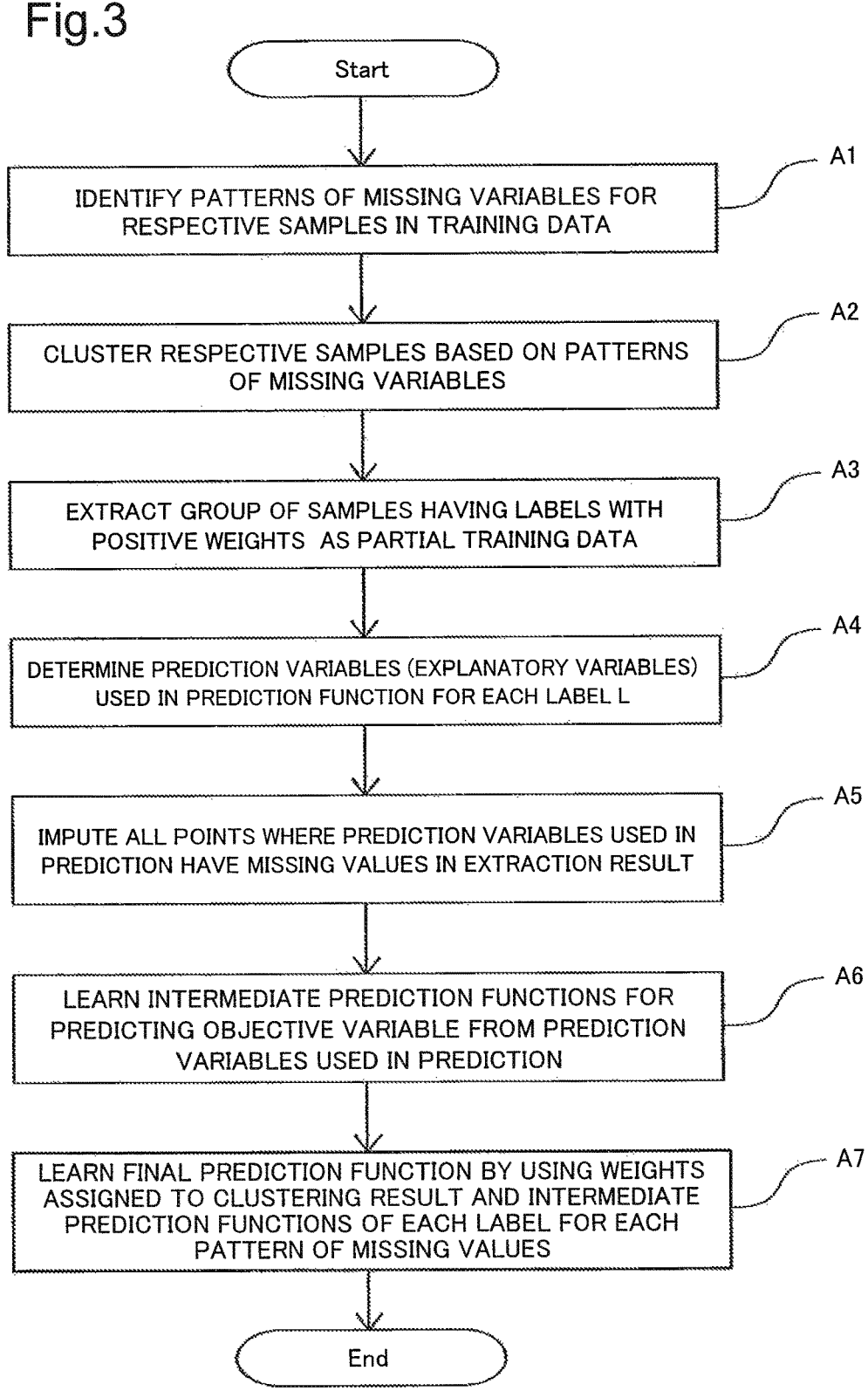
FIG. 3 is a flowchart illustrating an operation of the prediction function creation device in the exemplary embodiment of the present invention.

Next, an operation of the prediction function creation device 10 according to the exemplary embodiment of the present invention will be described by using FIG. 3. FIG. 3 is a flowchart illustrating an operation of the prediction function creation device according to the exemplary embodiment of the present invention. In the following description, FIGS. 1 and 2 are taken into consideration appropriately. In the exemplary embodiment, operating the prediction function creation device 10 causes the prediction function creation method to be carried out. Thus, the description of the prediction function creation method according to the exemplary embodiment will be substituted by the following description of an operation of the prediction function creation device 10.

As illustrated in FIG. 3, first, the clustering unit 11 identifies patterns of missing values for the explanatory variables in respective samples that constitute input training data (step A1). Next, the clustering unit 11, in accordance with the patterns of missing values for the explanatory variables in the respective samples, carries out clustering to assign weights to each label for the respective samples (step A2).

The "clustering" in step A2 is to assign labels and weights, numbers of which are finite, to the respective patterns of missing values.

Specifically, in step A2, with respect to each variety of set of explanatory variables without missing values in respective patterns of missing values for the explanatory variables, the clustering unit 11 identifies a group of samples applying to the variety (a group of samples in which a set of explanatory variables constituting the variety have no missing value). With respect to each pattern of missing values for the explanatory variables, the clustering unit 11 identifies a sample that is included in common in a sample that does not apply to the pattern and each of the identified groups of samples. The clustering unit 11 selects candidates in which the numbers of the identified samples are greater than or equal to a certain value, and gives a label to each of the selected candidates. The clustering unit 11 assigns a weight to each label in such a way that, the greater the number of the common samples identified with respect to each pattern of missing values is, the larger the value of the weight becomes.

With respect to each label given in step A2, learning of a "child model", which will be described later, is performed. In the exemplary embodiment, each label that is given through the clustering in step A2 will be denoted by "L" in the following description.

The child model creation unit 12 identifies candidates to which labels L with weights are given, and extracts a group of samples included in the identified candidates as the partial training data (step A3). The child model creation unit 12 also associates a weight assigned to a label L with each sample that constitutes the partial training data as the weight of the sample.

Next, with respect to each label with weight, the child model creation unit 12 determines a prediction variable among the explanatory variables in the partial training data to which the label is given (step A4).

Next, in the partial training data extracted in step A3, the missing variable imputation unit 14 confirms whether or not the prediction variable, which is determined in step A4, of the label given to the partial training data has a missing value in any sample. When there is a missing value, the missing variable imputation unit 14 imputes the prediction variable having a missing value in the sample, and updates the partial training data (step A5).

Next, with respect to each label with weight, the mixture model creation unit 13 learns an intermediate prediction function (child model) that derives the objective variable from the prediction variable by using the partial training data to which the label is given (step A6).

Next, when the mixture model creation unit 13 has learned child models for all labels, the mixture model creation unit 13 learns a final prediction function with respect to each pattern of missing values by using a weight assigned to the pattern and a child model for the label to which the weight is assigned (step A7).

As described above, in the exemplary embodiment, different final prediction functions are created corresponding to patterns of missing values for the explanatory variables. Among the patterns of missing values, patterns for which the common variable is used as a prediction variable are grouped together, and learning is performed with common samples. In other words, in the exemplary embodiment, with respect to each pattern of missing values, samples that have the common explanatory variable without missing value are grouped together, and learning is performed, in the creation of final prediction function. Thus, with the exemplary embodiment, it is possible to carry out prediction with high accuracy even when a lot of patterns of missing values for the explanatory variable are involved.

[Program]

A program according to the exemplary embodiment may be a program that causes a computer to execute steps A1 to A7 illustrated in FIG. 3. By installing the program into the computer and executing the program, it is possible to achieve the prediction function creation device 10 and the prediction function creation method according to the exemplary embodiment. In this case, a CPU (Central Processing Unit) in the computer functions as the clustering unit 11, the child model creation unit 12, the mixture model creation unit 13, and the missing variable imputation unit 14, and performs the processing of them.

Figure 4:
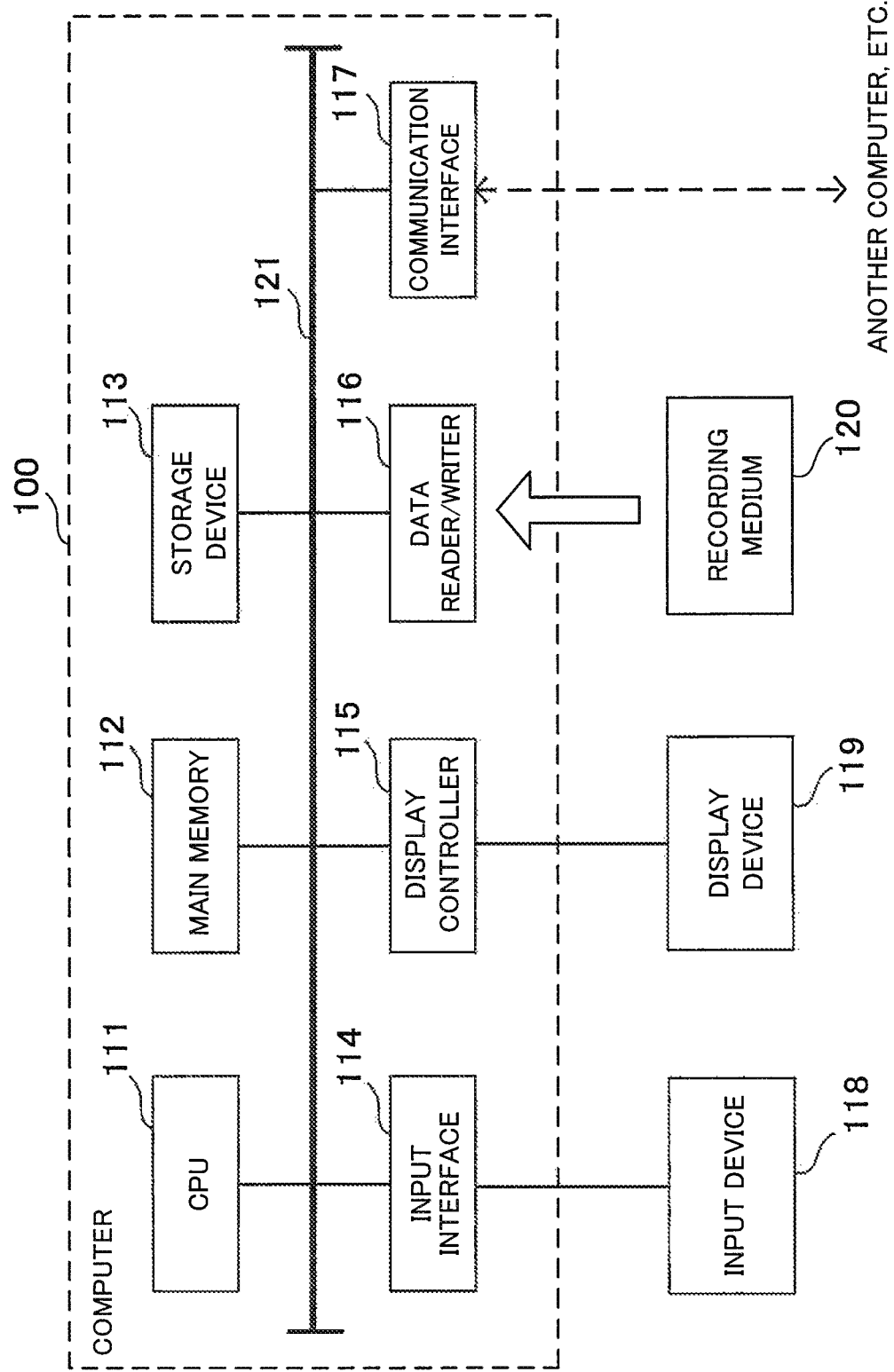
FIG. 4 is a block diagram illustrating an example of a computer that achieves the prediction function creation device in the exemplary embodiment of the present invention.

The computer that achieves the prediction function creation device 10 by executing the program according to the exemplary embodiment will be described by using FIG. 4. FIG. 4 is a block diagram illustrating an example of the computer that achieves the prediction function creation device according to the exemplary embodiment of the present invention.

As illustrated in FIG. 4, a computer 100 includes a CPU 111, a main memory 112, a storage device 113, an input interface 114, a display controller 115, a data reader/writer 116, and a communication interface 117. The each unit is connected with each other via a bus 121 in a data communicable manner.

The CPU 111 deploys the program (codes), which is stored in the storage device 113, according to the exemplary embodiment into the main memory 112, and performs each type of operations by executing them in a predetermined sequence. The main memory 112 is typically a transitory storage device such as a DRAM (Dynamic Random Access Memory). The program according to the exemplary embodiment is provided with a state stored in the computer-readable recording medium 120. The program according to the exemplary embodiment may be a program that is distributed on the Internet, which is connected via the communication interface 117.

Specific examples of the storage device 113 include a semiconductor storage device, such as a flash memory, besides a hard disk drive. The input interface 114 mediates data transmission between the CPU 111 and the input device 118, such as a keyboard and a mouse. The display controller 115 is connected with a display device 119, and controls display on the display device 119.

The data reader/writer 116 mediates data transmission between the CPU 111 and the recording medium 120, and performs to read the programs from the recording medium 120 and write a processing result of the computer 100 into the recording medium 120. The communication interface 117 mediates data transmission between the CPU 111 and other computers.

Specific examples of the recording medium 120 include a generic semiconductor storage device, such as a CF (Compact Flash (Registered Trademark)) and an SD (Secure Digital), a magnetic storage device, such as a flexible disk, or an optical storage medium, such as a CD-ROM (Compact Disk Read Only Memory).

EXAMPLE

An example corresponding to the above-described exemplary embodiment will be described by using FIGS. 5 to 10. The following description will be made along the respective steps illustrated in FIG. 3.

FIG. 5 is a diagram illustrating an example of training data used in the example. As illustrated in FIG. 5, in the example, a number is given to every sample that constitutes the training data. Every sample has three variables X1, X2, and X3 as explanatory variables and a variable Y as an objective variable. Missing values for explanatory variables are denoted by sign "NA"s.

In FIG. 5, it is assumed that a cell with "*" marked has any numerical value. In the example in FIG. 5, samples with numbers 1 to 5 have no missing value, samples with numbers 6 to 10 have missing values only for X1, samples with numbers 11 to 20 have missing values for X1 and X2, and samples with numbers 21 to 40 have missing values for X3. Specific operations when such training data are input are as follows.

[Step A1]

First, for respective samples in the training data, the clustering unit 11 identifies assumable patterns of missing values for the explanatory variables (hereinafter, referred to as "pattern of missing variable"). Since the explanatory variables in the samples are X1, X2, and X3, the clustering unit 11 identifies eight patterns as patterns of missing values, namely, an empty set (no missing value), a missing value for X1, a missing value for X2, a missing value for X3, missing values for X1 and X2, missing values for X2 and X3, missing values for X1 and X3, and missing values for all X1 to X3.

In the example in FIG. 5, for samples with numbers 1 to 40, the clustering unit 11 determines that samples with numbers 1 to 5 have no missing value, samples with numbers 6 to 10 have a missing value for X1, samples with numbers 11 to 20 have missing values for X1 and X2, and samples with numbers 21 to 40 have a missing value for X3.

[Step A2]

Next, in accordance with patterns of missing values for the explanatory variables in the respective samples, the clustering unit 11 carries out clustering to give labels to the respective samples, and assigns weights to the respective labels.

Specifically, as described below, the clustering unit 11 carries out clustering to allocate labels and weights to the samples. First, the clustering unit 11 identifies a case in which all three explanatory variables have no missing value, a case in which two explanatory variables have no missing value (only one explanatory variable has a missing value), a case in which only one explanatory variable has no missing value (two explanatory variables have missing values), a case in which all three explanatory variables have missing values, and the like. In the example, since the number of explanatory variables is three, eight patterns actually exist as the assumable cases. It is assumed that a set of explanatory variables with no missing value (hereinafter, referred to as "set of non-missing variables") in each of the assumable cases is A. The clustering unit 11 carries out the following calculation with respect to each variety of set A of non-missing variables. In the example, the calculation is carried out by multiplying [the number of samples which do not miss A] by [the number of elements in A] (=[the number of samples which do not miss A]*[the number of elements in A]).

FIG. 6 is a diagram illustrating an example of a result of the calculation with respect to each variety of set of non-missing variables supposed in the example. When multiplied values illustrated in FIG. 6 are obtained, by making all of A(s), the multiplied values of which are greater than or equal to a threshold value, candidates, the clustering unit 11 gives, as a label, a number allocated for each candidate to the group of samples that constitutes the respective candidates.

In the example in FIG. 6, it is assumed that the threshold value is set at 20. In this case, the clustering unit 11 makes respective sets of non-missing variables the multiplied values of which are greater than or equal to the threshold value, that is, X1, X2, X3, (X1, X2), and (X2, X3), the candidates, and gives numbers indicating labels to them (refer to FIG. 9). In the description below, the candidates are also denoted by a candidate (X1), a candidate (X2), a candidate (X3), a candidate (X1, X2), and a candidate (X2, X3). Further, as illustrated in FIG. 8, which will be described later, numbers 5, 1, 2, 3, and 4 are given to the candidate (X1), the candidate (X2), the candidate (X3), the candidate (X1, X2), and the candidate (X2, X3) as labels in this order.

Next, with respect to each assumable pattern of missing variables, the clustering unit 11 calculates a distance d(I, L) from each candidate. Specifically, the clustering unit 11 identifies an explanatory variable that has no missing value in common in both, and calculates a distance in such a way that, the greater the number of samples in which the identified explanatory variable has no missing values is, the larger the value of distance d becomes. For example, since an explanatory variable that has no missing value in common is X2 for the pattern X1 of missing variable and the candidate (X2), a distance d is calculated on the basis of the number of samples in which the explanatory variable X2 has no missing value.

For example, by assuming that a set of samples that include the explanatory variable without missing value for a pattern of missing variables is denoted by $I_1$ and a set of samples that include the explanatory variable without missing value for a candidate with a label L is denoted by $I_2$, the clustering unit 11 is able to calculate a distance d by using the following equation 1.

$$d(I,L):=|I_1 \backslash I_2|+\alpha|I_2 \backslash I_1| \quad \text{[Equation 1]}$$

In the above-described equation 1, α denotes an arbitrary integer, I denotes an arbitrary pattern of missing variables, and L denotes an arbitrary label number. It is also assumed that |·| indicates the number of elements in a set "·", and "A\B" indicates a set of elements included in a set A but not included in a set B. A result of calculation in the case of α=2 in the above-described equation 1 is illustrated in FIG. 7. FIG. 7 is a diagram illustrating an example of a result of calculation of the distances between patterns of missing variables and candidates in the example.

Next, for each pattern I of missing variables, when the distance d to each candidate is less than a threshold value, the clustering unit 11 calculates a similarity to the candidate the distance d to which is less than the threshold value by using the following equation 2.

$$\text{Similarity}=e^{-\lambda d(I,L)} \quad \text{[Equation 2]}$$

Next, the clustering unit 11 normalizes the respective similarities by using the following equation 3 in such a way that, for each pattern I of missing variables, the sum of the similarities, which are calculated for candidates the distances d to which are less than the threshold value, is 1. The clustering unit 11 outputs the obtained values as weights w(I, L) of labels L with respect to patterns I of missing variables.

$$w(I, L) := \frac{e^{-\lambda d(I,L)}}{\sum_L e^{-\lambda d(I,L)}} \quad \text{[Equation 3]}$$

A specific example of the result of calculation by the above-described equation 3 is illustrated in FIG. 8. FIG. 8 is a diagram illustrating an example of weights assigned to the respective labels in the example. The weights in the example in FIG. 8 are calculated under the assumption that the threshold value for distances d is 2.

In the example, it is also possible to carry out clustering by a method other than the above-described method in which assumable sets of non-missing variables (candidates) are used. For example, by defining a {0, 1} value vector with dimensions equal to the number of explanatory variables in such a way that, at each sample, a value of element is set 1 when the explanatory variable of element has a missing value and a value of element is set 0 when the explanatory variable of element has no missing value, it is also possible to carry out clustering by using an existing k-means method, dendrogram method, or the like.

[Step A3]

Next, the child model creation unit 12 extracts samples, that become patterns of missing variables with large weights assigned to labels, from the training data, associates sample weights with the extracted samples in such a way that, the larger a weight assigned to a label is, the larger a sample weight becomes, and outputs the extracted samples as partial training data.

For example, the child model creation unit 12 identifies sets of samples with positive weights assigned to labels L with respect to each pattern of missing variables, and associates a weight assigned to a label L with each identified sample as a sample weight. The child model creation unit 12 makes sets of samples associated with sample weights the partial training data.

[Step A4]

Next, with respect to each label, the child model creation unit 12 selects an explanatory variable (a prediction variable) used for prediction among the explanatory variables. At that time, in partial training data, the child model creation unit 12 increases the numbers of the explanatory variables selected as prediction variables as much as possible, and the number of samples in which the explanatory variable selected as a prediction variable has no missing value greater than the number of samples in which the other explanatory variable has no missing value.

Specifically, in the example, the child model creation unit 12 makes an explanatory variable (hereinafter, referred to as "candidate variable"), which constitutes a set of non-missing variables determined as a candidate at clustering, a prediction variable for each label. Thus, the child model creation unit 12 selects prediction variables, such as X2 for the label 1, X3 for the label 2, X1 and X2 for the label 3, X2 and X3 for label 4, and X1 for the label 5. Furthermore, at this time, the child model creation unit 12 identifies a sample that has no missing value for any candidate variables in the training data, and adds it to the partial training data.

In the example, a prediction variable is selected from explanatory variables which have no missing value in partial training data given a label given. However, the example is not intended to this. For example, a prediction variable may be selected from explanatory variables which have missing values in partial training data, and imputed thereafter.

FIG. 9 is a diagram illustrating an example of partial training data according to the example. As illustrated in FIG. 9, in the example, the partial training data is identified for every label. Sample numbers illustrated in FIG. 9 coincide with the numbers of respective samples illustrated in FIG. 3.

[Step A5]

Next, when there is a sample which has a missing value for a prediction variable in partial training data, the missing variable imputation unit 14 performs imputation for the sample. For example, the missing variable imputation unit 14 is capable of performing imputation by substituting, with a mean value of other prediction variables, a value of a prediction variable having a missing value in a sample in which the prediction variable has a missing value. The missing variable imputation unit 14 is also capable of performing imputation by using a single substitution method, a multiple substitution method, or the like, which perform regression on other variables. In the example, the partial training data is identified in such a way that no sample in which a prediction variable has a missing value is generated.

[Step A6]

Next, with respect to each label L, the mixture model creation unit 13 creates a prediction function from the prediction variable to the objective variable by using the partial training data, for example, by using a method such as linear regression or Support Vector Regression. In this case, the mixture model creation unit 13 calculates a loss function or a likelihood function by weighting in accordance with a weight of the sample.

Specifically, first, by assuming that a weight of a sample i is $w_i$ and a loss function of a model is $l(x_i, y_i)$, the mixture model creation unit 13 estimates a parameter $\beta$ by using the following equation 4, and creates a prediction function $f_L$ including $\beta$ with respect to each label L.

$$\hat{\beta} = \underset{\beta}{\operatorname{argmin}} \sum_i w_i l(x_i, y_i) \qquad \text{[Equation 4]}$$

For example, when performing linear regression in such a way as to minimize a square error, the mixture model creation unit 13 estimates a parameter $\beta$ by using the following equation 5, and creates a prediction function $f_L$ including $\beta$ with respect to each label L.

$$\hat{\beta} = \underset{\beta}{\operatorname{argmin}} \sum_i w_i |y_i - (\beta^T x_i + \beta_0)|^2 \qquad \text{[Equation 5]}$$

[Step A7]

Last, the mixture model creation unit 13 creates a final prediction function $f_I(x)$ with respect to each pattern I of missing variables in such a way that, the larger the weight w(I, L) assigned to a label L is, the more importance is placed on the prediction function created for the label L. A specific example of the final prediction function $f_I(x)$ is expressed by the following equation 6.

$$f_I(x) := \sum_L w(I, L) f_L(x) \qquad \text{[Equation 6]}$$

FIG. 10 is a diagram illustrating a specific example of the final prediction functions obtained in the example. The final prediction functions illustrated in FIG. 10 are obtained by also calculating w(I, L) for patterns of missing variables that are not illustrated in the example of training data in FIG. 3.

As described above, in the example, different final prediction functions corresponding to patterns of missing variables are created, as illustrated in FIG. 10. Thus, the example shows that, even when a lot of patterns of missing values for the explanatory variables are involved, it is possible to carry out prediction with high accuracy.

The whole or part of the exemplary embodiments and the examples disclosed above can be described as, but not limited to, the following supplementary note 1 to the supplementary note 15.

(Supplementary Note 1)

A prediction function creation device for, by using a set of samples that include explanatory variables and an objective variable as training data, creating a prediction function to derive the objective variable, the prediction function creation device includes:

a clustering unit that, in accordance with patterns of missing values for the explanatory variables in respective samples, carries out clustering to give labels to the respective samples, and, to each label, assigns weights in accordance with patterns of missing values for the explanatory variables in samples to which the label is given;

a child model creation unit that, on the basis of the assigned weights, makes portions of the training data partial training data, and, on the basis of patterns of missing values for the explanatory variables in the samples included in the partial training data, determines an explanatory variable that constitutes the prediction function among the explanatory variables with respect to each label; and a mixture model creation unit that, by using the explanatory variable and the partial training data that are determined with respect to each label, creates the prediction function with respect to each pattern of missing values.

(Supplementary Note 2)

The prediction function creation device according to supplementary note 1, wherein the clustering unit identifies an applied group of samples with each variety of set of explanatory variables without missing values corresponding to the respective patterns of missing values, further, with respect to each of the patterns of missing values, identifies a sample that is included in common in a samples that does not apply to the pattern and each of the identified groups of samples, gives a label to each group of the identified common samples the number of which is greater than or equal to a certain value, and thereafter, with respect to each of the patterns of missing values, assigns the weight to each label in such a way that, the greater the number of the identified common samples is, the larger the value of the weight becomes.

(Supplementary Note 3)

The prediction function creation device according to supplementary note 2, wherein the child model creation unit makes groups of samples assigned labels with the weights the partial training data, and with respect to each label with the weight, selects an explanatory variable that constitutes the prediction function among the explanatory variables.

(Supplementary Note 4)

The prediction function creation device according to supplementary note 3, wherein the mixture model creation unit, with respect to each label with the weight, creates a second prediction function that derives the objective variable from the determined explanatory variable by using the partial training data given the label is given, and with respect to each of the patterns of missing values, creates the prediction function by using the weight that is assigned for the pattern and the second prediction function for a label to which the weight is assigned.

(Supplementary Note 5)

The prediction function creation device according to supplementary note 4, further includes:

a missing variable imputation unit that, when a sample in which an explanatory variable, which is determined for a label given to the partial training data and constitutes the prediction function, is missed exists in the partial training data, imputes the explanatory variable that is missed in the sample, wherein the mixture model creation unit creates the second prediction function by using the imputed partial training data.

(Supplementary Note 6)

A prediction function creation method for, by using a set of samples that include explanatory variables and an objective variable as training data, creating a prediction function to derive the objective variable, the method includes:

(a) in accordance with patterns of missing values for the explanatory variables in respective samples, carrying out clustering to give labels to the respective samples, and, to each label, assigning weights in accordance with patterns of missing values for the explanatory variables in samples to which the label is given;

(b) on the basis of the assigned weights, making portions of the training data partial training data, and, on the basis of patterns of missing values for the explanatory variables in the samples included in the partial training data, determining an explanatory variable that constitutes the prediction function among the explanatory variables with respect to each label; and (c) by using the explanatory variable and the partial training data that are determined with respect to each label, creating the prediction function with respect to each pattern of missing values.

(Supplementary Note 7)

The prediction function creation method according to supplementary note 6, wherein in (a), identifying an applied group of samples with each variety of set of explanatory variables without missing values corresponding to the respective patterns of missing values, further, with respect to each of the patterns of missing values, identifying a sample that is included in common in a samples that does not apply to the pattern and each of the identified groups of samples, giving a label to each group of the identified common samples the number of which is greater than or equal to a certain value, and thereafter, with respect to each of the patterns of missing values, assigning the weight to each label in such a way that, the greater the number of the identified common samples is, the larger the value of the weight becomes.

(Supplementary Note 8)

The prediction function creation method according to supplementary note 7, in (b), making groups of samples assigned labels with the weights the partial training data, and with respect to each label with the weight, selecting an explanatory variable that constitutes the prediction function among the explanatory variables.

(Supplementary Note 9)

The prediction function creation method according to supplementary note 8, in (c), the mixture model creation unit, with respect to each label with the weight, creating a second prediction function that derives the objective variable from the determined explanatory variable by using the partial training data given the label is given, and with respect to each of the patterns of missing values, creating the prediction function by using the weight that is assigned for the pattern and the second prediction function for a label to which the weight is assigned.

(Supplementary Note 10)

The prediction function creation method according to supplementary note 9, further includes:

(d) when a sample in which an explanatory variable, which is determined for a label given to the partial training data and constitutes the prediction function, is missed exists in the partial training data, imputing the explanatory variable that is missed in the sample, wherein in (c), creating the second prediction function by using the imputed partial training data.

(Supplementary Note 11)

A computer-readable non-transitory recording medium embodying a program, the program causing a computer to perform a method the method for, by using a set of samples that include explanatory variables and an objective variable as training data, creating a prediction function to derive the objective variable, the method includes:

(a) in accordance with patterns of missing values for the explanatory variables in respective samples, carrying out clustering to give labels to the respective samples, and, to each label, assigning weights in accordance with patterns of missing values for the explanatory variables in samples to which the label is given;

(b) on the basis of the assigned weights, making portions of the training data partial training data, and, on the basis of patterns of missing values for the explanatory variables in the samples included in the partial training data, determining an explanatory variable that constitutes the prediction function among the explanatory variables with respect to each label; and (c) by using the explanatory variable and the partial training data that are determined with respect to each label, creating the prediction function with respect to each pattern of missing values.

(Supplementary Note 12)

The method according to supplementary note 11, wherein in (a), identifying an applied group of samples with each variety of set of explanatory variables without missing values corresponding to the respective patterns of missing values, further, with respect to each of the patterns of missing values, identifying a sample that is included in common in a samples that does not apply to the pattern and each of the identified groups of samples, giving a label to each group of the identified common samples the number of which is greater than or equal to a certain value, and thereafter, with respect to each of the patterns of missing values, assigning the weight to each label in such a way that, the greater the number of the identified common samples is, the larger the value of the weight becomes.

(Supplementary Note 13)

The method according to supplementary note 12, in (b), making groups of samples assigned labels with the weights the partial training data, and with respect to each label with the weight, selecting an explanatory variable that constitutes the prediction function among the explanatory variables.

(Supplementary Note 14)

The method according to supplementary note 13, in (c), the mixture model creation unit, with respect to each label with the weight, creating a second prediction function that derives the objective variable from the determined explanatory variable by using the partial training data given the label is given, and with respect to each of the patterns of missing values, creating the prediction function by using the weight that is assigned for the pattern and the second prediction function for a label to which the weight is assigned.

(Supplementary Note 15)

The method according to supplementary note 14, further including:

(d) when a sample in which an explanatory variable, which is determined for a label given to the partial training data and constitutes the prediction function, is missed exists in the partial training data, imputing the explanatory variable that is missed in the sample, wherein in (c), creating the second prediction function by using the imputed partial training data.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

This application is based upon and claims the benefit of priority from Japanese patent application No. 2013-123482, filed on Jun. 12, 2013, the disclosure of which is incorporated herein in its entirety by reference.

INDUSTRIAL APPLICABILITY

As described above, with the present invention, it is possible to carry out prediction with high accuracy even when a lot of variations of missing manner for the explanatory variables, that is, patterns of missing values for the explanatory variables, are involved. The present invention is useful for the field of predictive analysis, such as analysis of business log and purchase prediction in the future from a purchase history.

REFERENCE SINGS LIST

11 Clustering unit
12 Child model creation unit
13 Mixture model creation unit
14 Missing variable imputation unit
100 Computer
110 Terminal
111 CPU
112 Main memory
113 Storage device
114 Input interface
115 Display controller
116 Data reader/writer
117 Communication interface
118 Input device
119 Display device
120 Recording medium
121 Bus

What is claimed is:

1. A prediction function creation device constructed on a computer for, by using a set of samples that include explanatory variables and an objective variable as training data, creating a prediction function to derive the objective variable, the prediction function creation device comprising:

a clustering unit that, in accordance with patterns of missing values for the explanatory variables in respective samples, carries out clustering to give labels to the respective samples, and, to each label, assigns weights in accordance with patterns of missing values for the explanatory variables in samples to which the label is given;

a child model creation unit that, on the basis of the assigned weights, makes portions of the training data partial training data, and, on the basis of patterns of missing values for the explanatory variables in the samples included in the partial training data, determines an explanatory variable that constitutes the prediction function among the explanatory variables with respect to each label; and a mixture model creation unit that, by using the explanatory variable and the partial training data that are determined with respect to each label, creates the prediction function with respect to each pattern of missing values, wherein the clustering unit carries out clustering to give labels by using multiplied values with respect to varieties of a set of non-missing variables, the multiplied value being acquired by multiplying a number of samples that do not miss the set of non-missing variables by a number of non-missing variables in the set, and wherein the created prediction function has improved machine learning predictive accuracy for the training data having the missing values.

2. The prediction function creation device according to claim 1, wherein the clustering unit identifies an applied group of samples with each variety of set of explanatory variables without missing values corresponding to the respective patterns of missing values, further, with respect to each of the patterns of missing values, identifies a sample that is included in common in a samples that does not apply to the pattern and each of the identified groups of samples, gives a label to each group of the identified common samples the number of which is greater than or equal to a certain value, and thereafter, with respect to each of the patterns of missing values, assigns the weight to each label in such a way that, the greater the number of the identified common samples is, the larger the value of the weight becomes.

3. The prediction function creation device according to claim 2, wherein the child model creation unit makes groups of samples assigned labels with the weights the partial training data, and with respect to each label with the weight, selects an explanatory variable that constitutes the prediction function among the explanatory variables.

4. The prediction function creation device according to claim 3, wherein the mixture model creation unit, with respect to each label with the weight, creates a second prediction function that derives the objective variable from the determined explanatory variable by using the partial training data given the label is given, and with respect to each of the patterns of missing values, creates the prediction function by using the weight that is assigned for the pattern and the second prediction function for a label to which the weight is assigned.

5. The prediction function creation device according to claim 4, further comprising:
a missing variable imputation unit that, when a sample in which an explanatory variable, which is determined for a label given to the partial training data and constitutes the prediction function, is missed exists in the partial training data, imputes the explanatory variable that is missed in the sample,
wherein the mixture model creation unit creates the second prediction function by using the imputed partial training data.

6. A prediction function creation method for, by using a set of samples that include explanatory variables and an objective variable as training data, creating a prediction function to derive the objective variable, the method comprising:
(a) in accordance with patterns of missing values for the explanatory variables in respective samples, carrying out clustering to give labels to the respective samples, and, to each label, assigning weights in accordance with patterns of missing values for the explanatory variables in samples to which the label is given;
(b) on the basis of the assigned weights, making portions of the training data partial training data, and, on the basis of patterns of missing values for the explanatory variables in the samples included in the partial training data, determining an explanatory variable that constitutes the prediction function among the explanatory variables with respect to each label; and
(c) by using the explanatory variable and the partial training data that are determined with respect to each label, creating the prediction function with respect to each pattern of missing values,
wherein the clustering is carried out to give labels by using multiplied values with respect to varieties of a set of non-missing variables, the multiplied value being acquired by multiplying a number of samples that do not miss the set of non-missing variables by a number of non-missing variables in the set,
and wherein the created prediction function has improved machine learning predictive accuracy for the training data having the missing values.

7. A computer-readable non-transitory recording medium embodying a program, the program causing a computer to perform a method, the method for, by using a set of samples that include explanatory variables and an objective variable as training data, creating a prediction function to derive the objective variable, the method comprising:
(a) in accordance with patterns of missing values for the explanatory variables in respective samples, carrying out clustering to give labels to the respective samples, and, to each label, assigning weights in accordance with patterns of missing values for the explanatory variables in samples to which the label is given;
(b) on the basis of the assigned weights, making portions of the training data partial training data, and, on the basis of patterns of missing values for the explanatory variables in the samples included in the partial training data, determining an explanatory variable that constitutes the prediction function among the explanatory variables with respect to each label; and
(c) by using the explanatory variable and the partial training data that are determined with respect to each label, creating the prediction function with respect to each pattern of missing values,
wherein the clustering is carried out to give labels by using multiplied values with respect to varieties of a set of non-missing variables, the multiplied value being acquired by multiplying a number of samples that do not miss the set of non-missing variables by a number of non-missing variables in the set,
and wherein the created prediction function has improved machine learning predictive accuracy for the training data having the missing values.

* * * * *